United States Patent
Donato et al.

(10) Patent No.: US 11,401,942 B2
(45) Date of Patent: Aug. 2, 2022

(54) FASTENER ARRANGEMENT FOR ROTATING GROUP OF TURBOMACHINE

(71) Applicant: Garrett Transportation I Inc, Torrance, CA (US)

(72) Inventors: Brent Donato, Torrance, CA (US); Luca Tabacchi, Redondo Beach, CA (US); Ryoken Matsuzaki, Torrance, CA (US)

(73) Assignee: GARRETT TRANSPORTATION I INC, Torrance, CA (US)

( * ) Notice: Subject to any disclaimer, the term of this patent is extended or adjusted under 35 U.S.C. 154(b) by 132 days.

(21) Appl. No.: 16/874,979

(22) Filed: May 15, 2020

(65) Prior Publication Data

US 2021/0355956 A1 Nov. 18, 2021

(51) Int. Cl.
*F04D 29/26* (2006.01)

(52) U.S. Cl.
CPC ........ *F04D 29/266* (2013.01); *F05B 2230/60* (2013.01); *F05B 2240/20* (2013.01); *F05D 2230/60* (2013.01); *F05D 2230/64* (2013.01); *F05D 2240/20* (2013.01)

(58) Field of Classification Search
CPC .. F04D 29/263; F04D 29/266; F05D 2230/60; F05D 2230/64; F05D 2240/20
See application file for complete search history.

(56) References Cited

U.S. PATENT DOCUMENTS

| | | | | |
|---|---|---|---|---|
| 3,941,506 | A | * | 3/1976 | Robb ................... F04D 25/163 416/244 A |
| 4,815,931 | A | * | 3/1989 | Linck ....................... F01D 3/00 415/124.1 |
| 6,364,634 | B1 | | 4/2002 | Svihla et al. |
| 6,499,969 | B1 | | 12/2002 | Tombers et al. |
| 6,764,281 | B2 | * | 7/2004 | Bosen .................. F01D 25/125 416/204 R |
| 6,896,479 | B2 | * | 5/2005 | Svihla .................... F01D 5/026 415/104 |
| 7,909,578 | B2 | | 3/2011 | Nishiyama et al. |
| 9,537,363 | B2 | | 1/2017 | Thompson et al. |
| 9,709,068 | B2 | | 7/2017 | Thompson et al. |
| 9,835,164 | B2 | * | 12/2017 | Svihla ....................... F02C 6/12 |
| 2016/0319832 | A1 | * | 11/2016 | Takahara .............. F04D 25/163 |

(Continued)

FOREIGN PATENT DOCUMENTS

| | | | |
|---|---|---|---|
| CN | 102966595 B | | 3/2013 |
| CN | 102966595 B | * | 4/2015 |
| CN | 107355419 A | * | 11/2017 |

(Continued)

*Primary Examiner* — Brian P Wolcott
(74) *Attorney, Agent, or Firm* — Lorenz & Kopf LLP (57) ABSTRACT

A turbomachine includes a housing and a rotating group that is supported for rotation about an axis within the housing. The rotating group includes a rotor shaft, a wheel, and a fastener that clamps the wheel to the rotor shaft. The fastener is unitary and includes a head and a shank. The shank includes a piloting feature on an arcuate surface that faces radially outward with respect to the axis. The shank is received in the wheel and is attached to the rotor shaft with the piloting feature being piloted to an arcuate inner radial surface of the wheel. The head abuts an axial surface of the wheel for axially clamping the wheel to the rotor shaft.

20 Claims, 4 Drawing Sheets

(56) References Cited

U.S. PATENT DOCUMENTS

2019/0145416 A1\* 5/2019 Donato ................ F04D 25/024
　　　　　　　　　　　　　　　　　　　　　　415/100

FOREIGN PATENT DOCUMENTS

| CN | 112594200 A \* | 4/2021 | |
|---|---|---|---|
| DE | 102010039889 A1 | 3/2012 | |
| DE | 102019211237 A1 \* | 2/2021 | ........... F04D 29/266 |
| EP | 0093990 A2 | 4/1983 | |
| EP | 3483450 A1 | 5/2019 | |
| EP | 3617519 A1 \* | 3/2020 | ........... F04D 29/462 |
| FR | 2819560 A1 \* | 7/2002 | ........... F04D 29/266 |
| FR | 3029996 A1 \* | 6/2016 | ........... F04D 29/263 |
| GB | 775456 A | 5/1957 | |
| JP | 5872602 A | 4/1983 | |
| WO | WO-2014195091 A1 \* | 12/2014 | ............. F01D 5/066 |
| WO | WO-2020134432 A1 \* | 7/2020 | ............ F04D 29/28 |
| WO | 2021018455 A1 | 2/2021 | |

\* cited by examiner

FASTENER ARRANGEMENT FOR ROTATING GROUP OF TURBOMACHINE

TECHNICAL FIELD

The present disclosure generally relates to a turbomachine and, more particularly, relates to a fastener arrangement for a rotating group of a turbomachine.

BACKGROUND

Turbomachines generally include a housing and a rotating group supported for rotation within the housing. The rotating group includes a wheel that opposes a shroud surface of the housing. In the case of a compressor, a fluid flows past the compressor wheel and shroud surface and is compressed. In the case of a turbine, the fluid is expanded and drives rotation of the turbine wheel and other components of the rotating group.

It is important for the rotating group to be balanced for rotation within the housing. When balanced, the center of gravity of the rotating group is as close as possible to its center of rotation. Efforts are made to make components of the rotating group coaxial and centered on the axis. Once manufactured and assembled, the rotating group can be balanced to reduce imbalance (unbalance). Otherwise, vibration loads, excessive centrifugal loads, or other related loads can cause noise, premature wear, or other problems for the turbomachine.

However, turbomachines include a large number of parts, and individual parts can contribute to a tolerance stack-up, thereby increasing unbalance of the rotating group. In particular, conventional fastener arrangements of the rotating group can include components that specifically increase the likelihood or degree of unbalance, runout, eccentricity, tolerance stack-up, etc. For example, in conventional fastener arrangements a nut is tightened on the free end of rotating group, clamping a wheel onto the supporting shaft. This nut may act as a hanging mass that contributes significantly to these problems.

Also, during manufacturing of the turbomachine, the balancing process itself may be difficult due to the fastener configuration. Furthermore, conventional fastener arrangements can make testing (e.g., runout testing) inconvenient.

Thus, it is desirable to provide an improved fastener arrangement for attaching a wheel onto a rotor shaft of a rotating group of a turbomachine. Specifically, it is desirable to provide a fastener arrangement that is less likely to contribute to tolerance stack-up, eccentricity, runout, etc. Furthermore, it is desirable to provide an improved fastener arrangement that facilitates balancing, assembly, testing, and/or other manufacturing procedures. Other desirable features and characteristics of the present disclosure will become apparent from the subsequent detailed description and the appended claims, taken in conjunction with the accompanying drawings and this background discussion.

BRIEF SUMMARY

In one embodiment, a turbomachine is disclosed that includes a housing and a rotating group that is supported for rotation about an axis within the housing. The rotating group includes a rotor shaft, a wheel, and a fastener that clamps the wheel to the rotor shaft. The fastener is unitary and includes a head and a shank. The shank includes a piloting feature on an arcuate surface that faces radially outward with respect to the axis. The shank is received in the wheel and is attached to the rotor shaft with the piloting feature being piloted to an arcuate inner radial surface of the wheel. The head abuts an axial surface of the wheel for axially clamping the wheel to the rotor shaft.

In another embodiment, a method of manufacturing a turbomachine is disclosed. The method includes attaching a wheel to a rotor shaft using a fastener to define a rotating group. The method also includes supporting the rotating group within in a housing for rotation about an axis. The fastener is unitary and includes a head and a shank. The shank includes a piloting feature on an arcuate surface that faces radially outward with respect to the axis. Attaching the wheel to the rotor shaft includes receiving the shank in the wheel, attaching the fastener to the rotor shaft, piloting the piloting feature to an arcuate inner radial surface of the wheel, and abutting the head against an axial surface of the wheel for axially clamping the wheel to the rotor shaft In a further embodiment, an electric motorized compressor device is disclosed. The device includes a housing and a rotating group that is supported for rotation about an axis within the housing. The rotating group includes a rotor shaft, a wheel, and a fastener arrangement that attaches the wheel to the rotor shaft. The compressor device further includes an electric motor that drives rotation of the rotating group about the axis within the housing. The fastener arrangement includes a fastener that is received in a bore of the wheel and in a hole of the rotor shaft. The fastener is unitary and includes a head and a shank. The shank includes at least one piloting feature on an arcuate surface that faces radially outward with respect to the axis. The shank is received in the bore wheel and is threadably attached within the hole of the rotor shaft with the piloting feature being piloted to an arcuate inner radial surface of the wheel. The head abuts an axial surface of the wheel for axially clamping the wheel to the rotor shaft.

BRIEF DESCRIPTION OF THE DRAWINGS

The present disclosure will hereinafter be described in conjunction with the following drawing figures, wherein like numerals denote like elements, and wherein.

DETAILED DESCRIPTION

The following detailed description is merely exemplary in nature and is not intended to limit the present disclosure or the application and uses of the present disclosure. Furthermore, there is no intention to be bound by any theory presented in the preceding background or the following detailed description.

Broadly, example embodiments disclosed herein include a turbomachine with a housing and a rotating group housed therein. The rotating group has a wheel that is fastened (clamped) to a shaft with an improved fastener arrangement. The fastener arrangement may include a unitary, one-piece member with a head and a shank. The head may abut an axial surface of the wheel for clamping it to the shaft. The shank may include at least one piloting feature (a piloting surface) that is piloted to a corresponding surface of the wheel. The piloting feature of the shank may be included on an arcuate surface facing outward radially with respect to the axis of rotation of the rotating group, and this surface may be piloted to an arcuate inner radial surface of the wheel. Furthermore, in some embodiments, the shank may include a piloting feature that is piloted to the rotor shaft. Accordingly, the fastener arrangement of the present disclosure is less likely to contribute to imbalance of the rotating group as compared with conventional fastener arrangements (e.g., those with a nut that is attached to a free end thereof). Furthermore, as will be discussed, the fastener arrangement of the present disclosure facilitates balancing, assembly, testing, and/or other manufacturing procedures.

Figure 1:
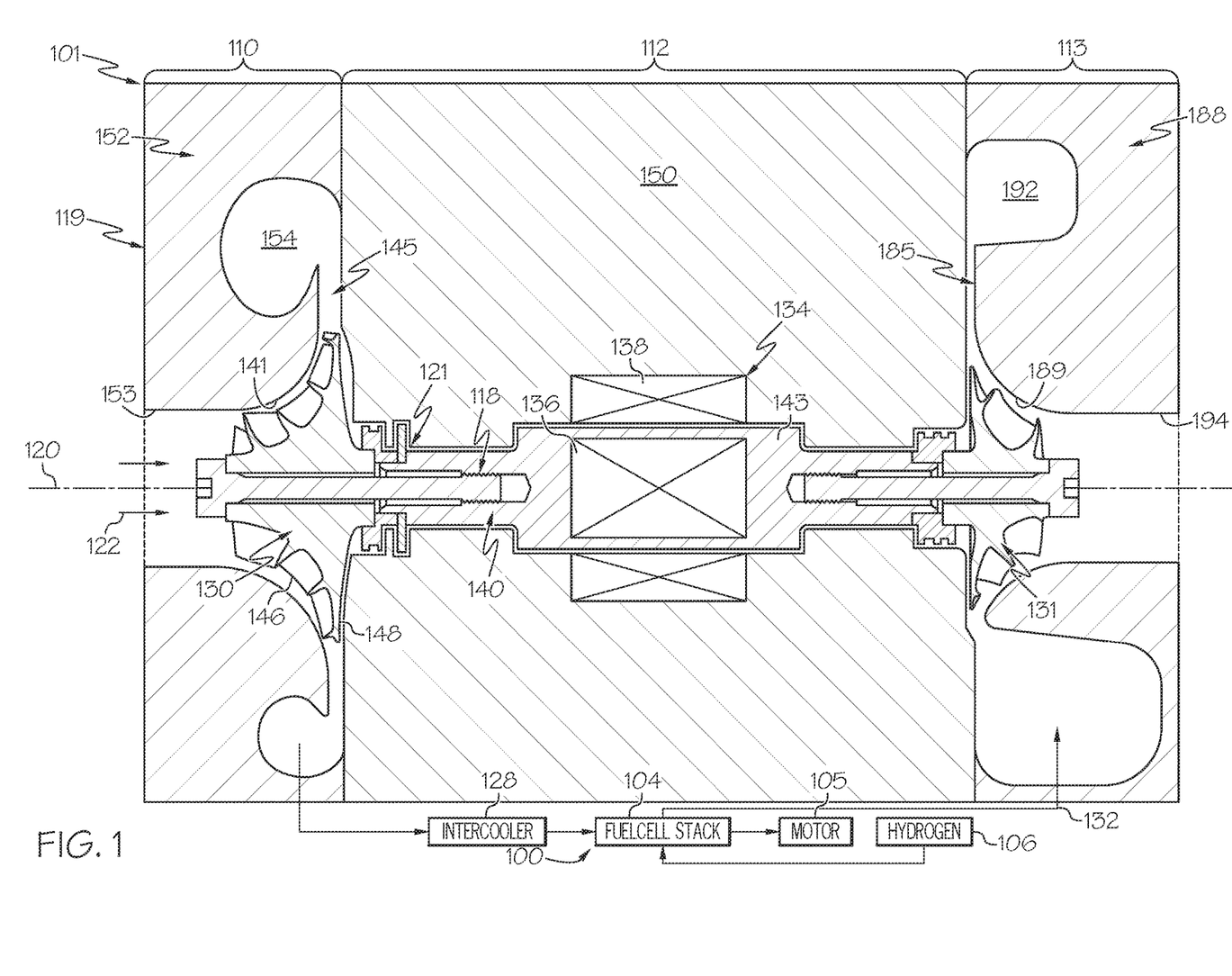
FIG. 1 is schematic illustration of a fuel cell system with a motorized electric compressor device shown in axial cross section according to example embodiments of the present disclosure.

Referring initially to FIG. 1, a turbomachine 101 is shown according to example embodiments. As shown, the turbomachine 101 generally includes a housing 119 (shown schematically) and a rotating group 118 supported for rotation within the housing 119 about an axis of rotation 120 by one or more bearings 121. In some embodiments, the rotating group 118 and the housing 119 may cooperatively define a compressor section 110 and a turbine section 113. Also, a motor section 112 may be disposed axially between the compressor and turbine sections 110, 113.

The turbomachine 101 may be operatively connected to a fuel cell system 100 and may be configured as an e-charger or electric motorized compressor device for the fuel cell system 100. However, it will be appreciated that the turbomachine 101 may configured differently from the embodiments shown and that the turbomachine 101 may be incorporated in another system without departing from the scope of the present disclosure. The fuel cell system 100 may include a fuel cell stack 104 containing a plurality of fuel cells. Hydrogen may be supplied to the fuel cell stack 104 from a tank 106, and oxygen may be supplied to the fuel cell stack 104 to generate electricity by a known chemical reaction. The fuel cell stack 104 may generate electricity for an electrical device, such as an electric motor 105. In some embodiments, the fuel cell system 100 may be included in a vehicle, such as a car, truck, sport utility vehicle, van, motorcycle, etc. Therefore, in some embodiments, the electric motor 105 may convert the electrical power to mechanical power to drive and rotate an axle (and, thus, one or more wheels) of the vehicle.

Oxygen may be provided to the fuel cell stack 104, at least in part, by the turbomachine 101. More specifically, the motor section 112 may drive rotation of the rotating group 118, and the compressor section 110 may provide a compressed air stream to an intercooler 128 as it flows to the stack 104, and exhaust from the stack 104 may be fed back to the turbine section 113 for providing power assist to the motor section 112. It will be appreciated, however, that other embodiments of the turbomachine 101 fall within the scope of the present disclosure. For example, in some embodiments, the turbine section 113 may be omitted such that the turbomachine 101 includes the motor section 112 as well as the compressor section 110. Additionally, in some embodiments, the turbomachine 101 may include a plurality of sections, such as a plurality of compressor sections that are fluidly connected in succession to include a first (low pressure) stage that feeds a second (high pressure) stage that ultimately feeds the fuel cell system 100. In further embodiments, the turbomachine 101 may be provided in systems other than the fuel cell system 100 without departing from the scope of the present disclosure.

As schematically illustrated in FIG. 1, the housing 119 of the turbomachine 101 may include a compressor housing 152, a motor housing 150, and a turbine housing 188. The compressor housing 152 may define part of the compressor section 110, the motor housing 150 may define part of the motor section 112, and the turbine housing 188 may define part of the turbine section 113, and these parts of the housing 119 may be assembled together as detailed below to house the rotating group 118.

The compressor housing 152 may include one or more parts that define an inlet 153 extending along and centered on the axis 120. The compressor housing 152 may also include a convex compressor shroud surface 141 that is positioned in a downstream direction from the inlet 153. The shroud surface 141 may oppose a compressor wheel 130 of the rotating group 118 and may have inverse contour relative thereto. The compressor housing 152 also may include a volute passage 154 that extends about the axis 120 and that is positioned downstream from the shroud surface 141. The volute passage 154 may be fluidly connected to the intercooler 128 for providing fluid flow thereto.

The motor housing 150 may include one or more parts that define a cavity for receiving and housing one or more parts of a motor 134 (e.g., an electric motor). In some embodiments, the motor housing 150 may house and support a stator member 138 of the motor 134, whereas a rotor member 136 of the motor 134 may be supported on the rotating group 118. The compressor housing 152 may be fixed to one axial face of the motor housing 150. As such, the compressor housing 152 may cover over a front side 146 of the compressor wheel 130, and a back side 148 of the compressor wheel 130 may face toward the motor section 112. Furthermore, in some embodiments, the compressor housing 152 and the motor housing 150 may cooperatively define a diffuser area 145 of the flow path of the compressor section 110. The diffuser area 145 may be disposed along the flow path between the compressor wheel 130 and the volute passage 154 (i.e., between the compressor wheel 130 and the volute passage 154).

Additionally, the housing 119 may include a turbine housing 188. The turbine housing 188 may include a circumferential inlet passage 192 that extends about the axis 120. As represented in FIG. 1, the passage 192 may be a volute passage in which the cross sectional area gradually changes as it extends about the axis 120. In other embodiments, the passage 192 may be toroidal such that the cross sectional area remains substantially the same as it extends about the axis 120. The passage 192 may be fluidly connected to the fuel cell stack 104 to receive exhaust therefrom. The turbine housing 188 may also include a convex turbine shroud surface 189 that is positioned in a downstream direction from the circumferential inlet passage 192. The turbine shroud surface 189 may oppose a turbine wheel 131 of the rotating group 118 and may have inverse contour relative thereto. The turbine housing 188 also may include an outlet passage 194 that extends along and that is centered on the axis 120. The outlet passage 194 may be positioned downstream from the turbine shroud surface 189. The turbine housing 188 may be fixed to the axial face of the motor housing 150 that is opposite to the one supporting the compressor housing 152. In some embodiments, the turbine housing 188 and the motor housing 150 may cooperatively define an inlet area 185 of the turbine section 113. The inlet area 185 may be disposed in the flow path of the turbine section 113, positioned downstream of the passage 192 and upstream from the turbine wheel 131 (i.e., between the passage 192 and the turbine wheel 131).

During operation of the turbomachine 101, an inlet airstream (represented by arrows 122 in FIG. 1) may flow into the inlet 153, and the inlet airstream 122 may be compressed as it flows downstream between the compressor wheel 130 and the shroud surface 141, through the diffuser area 145, and into the volute passage 154. A compressed airstream (represented by arrow 124) may exit the volute passage 154 and may be directed to the intercooler 128 and then to the fuel cell stack 104 for boosting the operating efficiency of the fuel cell system 100. Furthermore, in some embodiments, an exhaust gas stream (represented by arrow 132) from the fuel cell stack 104 may be directed back toward the turbomachine 101 and received by the passage 192 of the turbine section 113. The exhaust gas stream 132 may flow through the inlet area 185 to the turbine wheel 131 and may drive rotation of the turbine wheel 131 before flowing to the outlet passage 194. Mechanical power from the turbine section 113 may be converted to electrical power for the motor 134 for ultimately assisting in rotation of the compressor wheel 130.

The rotating group 118 will now be discussed in greater detail according to example embodiments of the present disclosure and with reference to FIGS. 2 and 3. As shown, the rotating group 118 may include a rotor shaft 140. The rotor shaft 140 may comprise one or more parts that is/are made of metal or other suitable material. The rotor shaft 140 may be cylindrical and may be centered on the axis 120. The rotor shaft 140 may include a first end 142 (FIG. 2) and a second end 144 (FIG. 3), which are spaced apart axially. The rotor shaft 140 may also include an intermediate portion 143 disposed axially between the first and second ends 142, 144. The rotor shaft 140 may also have an outer surface 139 (i.e., an outer diameter surface) that faces radially outward from the axis 120. The rotor shaft 140 may define a diameter 125 (i.e., a shaft width) that is measured radially between opposite areas of the outer surface 139 and through the axis 120.

In some embodiments, the diameter 125 of the rotor shaft 140 may vary along its axial length. For example, the diameter 125 of the rotor shaft 140 may be largest along the intermediate portion 143, and the diameter 125 may reduce as the rotor shaft 140 extends axially away from the intermediate portion 143 toward the first and second ends 142, 144.

Accordingly, the rotor shaft 140 may include a first shoulder 160 (FIG. 2) at a transition between the intermediate portion 143 and a first journal portion 162 of the rotor shaft 140. Furthermore, the rotor shaft 140 may include a second shoulder 164 at a transition between the first journal portion 162 and a first projecting end 166 of the rotor shaft 140. Thus, the diameter 125 of the rotor shaft 140 may reduce in a stepped fashion at the first shoulder 160, and the diameter 125 may further reduce in a stepped fashion at the second shoulder 164. Also, the first projecting end 166 may project axially from the second shoulder 164 to define the terminus of the rotor shaft 140 at the first end 142.

Figure 3:
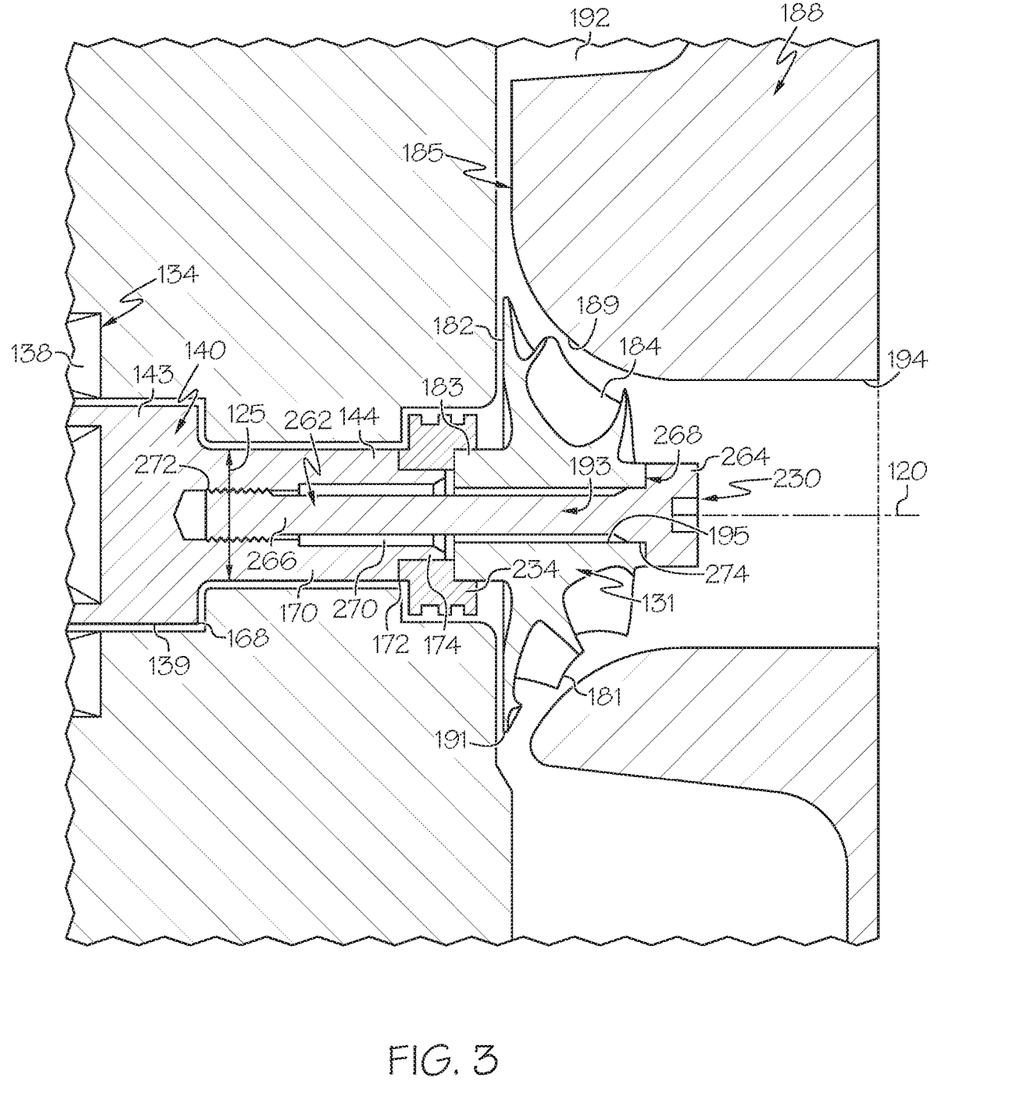
FIG. 3 is an axial section view of a turbine section of the compressor device of FIG. 1.

Likewise, as shown in FIG. 3, the rotor shaft 140 may include a third shoulder 168 at a transition between the intermediate portion 143 and a second journal portion 170 of the rotor shaft 140. Furthermore, the rotor shaft 140 may include a fourth shoulder 172 at a transition between the second journal portion 170 and a second projecting end 174 of the rotor shaft 140. Thus, the diameter 125 of the rotor shaft 140 may reduce in a stepped fashion at the third shoulder 168, and the diameter 125 may further reduce in a stepped fashion at the fourth shoulder 172. Also, the second projecting end 174 may project axially from the fourth shoulder 172 to define the terminus of the rotor shaft 140 at the second end 144.

The intermediate portion 143 of the rotor shaft 140 may support the rotor member 136 of the motor. Although shown schematically in FIGS. 2-3, it will be understood that the rotor member 136 may have a variety of configurations without departing from the scope of the present disclosure. In some embodiments, the rotor member 136 may include a plurality of permanent magnets that are fixed to the intermediate portion 143 of the rotor shaft 140 and arranged about the axis of rotation 120 so as to radially oppose the stator member 138. It will be appreciated that the increased diameter 125 at the intermediate portion 143 can allow the rotor member 136 to be relatively large in the radial direction and relatively short in the axial direction. As such, this configuration allows the motor 134 (and, thus, the turbomachine 101) to be relatively compact without substantially sacrificing motor performance.

The rotor shaft 140 may also support and/or define features of the bearing 121. As shown, the bearing 121 may be configured as an air bearing, a plain bearing, and/or an oil-less bearing. However, it will be appreciated that the bearing 121 may include roller elements or other alternative features without departing from the scope of the present disclosure.

Figure 2:
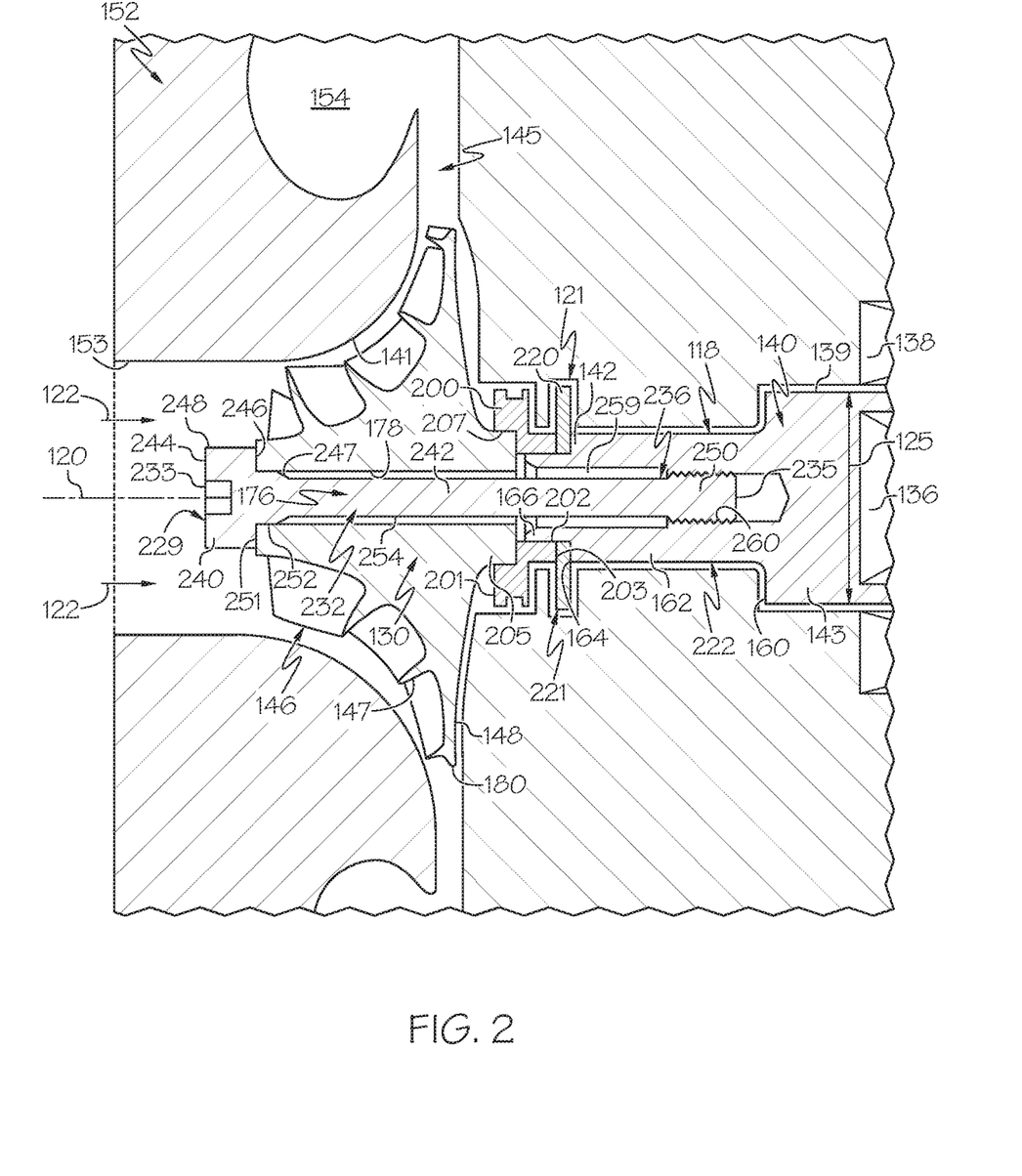
FIG. 2 is an axial section view of a compressor section of the compressor device of FIG. 1.

As shown in FIG. 2, the bearing 121 may include a thrust bearing member 221 that supports the rotating group 118 primarily against thrust loads directed along the axis 120. The thrust bearing member 221 may include a thrust disc 220. The thrust disc 220 may be an annular disc that is relatively flat and that is received on the first projecting end 166 of the rotor shaft 140. The thrust disc 220 may be fixed to the first projecting end 166 with the inner part of one axial face abutting against the second shoulder 164.

Moreover, the bearing 121 may include a journal bearing member 222 that supports the rotating group 118 primarily against radial loads directed radial to the axis 120. In some embodiments, the journal bearing member 222 may be defined by the first journal portion 162 of the rotor shaft 140 (FIG. 2) and the second journal portion 170 of the rotor shaft 140 (FIG. 3). In some embodiments, the bearing 121 may include one or more journal housings-parts that are independent of the rotor shaft 140 and that support the journaling rotation of the first and second journal portions 162, 170 of the rotor shaft 140.

Furthermore, the turbomachine 101 may include a fluid supply (e.g., an air line) that supplies a flow of fluid (e.g., air) for the bearing 121. This fluid may flow between the thrust disc 220 and surrounding areas of the housing 119. The fluid flow may also be provided between the first and second journal portions 162, 170. Accordingly, this fluid path may maintain a thin fluid film therebetween to support rotation of the rotating group 118 and to cool components of the rotating group 118 and/or housing 119.

The thrust disc 220 may be received on the first projection end 166 of the rotor shaft 140. The thrust disc 220 may be compressed between the second shoulder 164 and a collar 200 of the rotating group 118.

The collar 200 may be a unitary, annular piece that is made out of metal (e.g., steel). The collar 200 may include a front side 201 and a back side 203. The front side 201 of the collar 200 may face the compressor wheel 130, and the back side 203 may face axially in the opposite direction. Also, the collar 200 may include an inner diameter portion 202 defining a hole that receives the first projection end 166 of the rotor shaft 140. The inner diameter portion 202 may be pressed onto the first projection end 166 so as to have a frictional and/or interference fit between the inner diameter surface of the collar 200 and the outer diameter surface of the first projection end 166. The back side 203 may be projected axially to butt up against the thrust disc 220. The front side 201 may include a front side recess 207 that is recessed axially to receive a hub 205 of the compressor wheel 130.

The compressor wheel 130 may be a unitary, one-piece member that is generally frusto-conic. The compressor wheel 130 may be made out of metal (e.g., a metal containing aluminum). As stated above, the compressor wheel 130 may include a front side 146 and a back side 148. The back side 148 may include the hub 205, which may project toward the first end 142 of the rotor shaft 140. Further outward radially from the hub 205, the back side 148 of the compressor wheel 130 may be smooth and may extend primarily in the radial direction away from the axis 120. On the front side 146, the compressor wheel 130 may include a plurality of blades 147 that oppose the shroud surface 141. The compressor wheel 130 may also include an outer radial edge 180. The compressor wheel 130 may also include a bore 176 that extends along the axis 120 through the compressor wheel 130 and that is centered on the axis 120. The bore 176 may be defined by an inner diameter surface 178. The inner diameter surface 178 may have a substantially constant diameter as it extends through the compressor wheel 130.

The hub 205 of the compressor wheel 130 may be received and fixed inside the front side recess 207 of the collar 200. In some embodiments, the hub 205 may be received within the recess 207 so as to have a frictional and/or interference fit between the outer diameter surface of the hub 205 and the inner diameter surface of the collar 200.

The compressor wheel 130, collar 200, and thrust disc 220 may be clamped in an axial stack-up against the shoulder 164 of the rotor shaft 140 via a fastener arrangement 229 of the present disclosure. In some embodiments, the fastener arrangement 229 may include a single, unitary, one-piece fastener 232. The fastener 232 may engage both the rotor shaft 140 and the compressor wheel 130 for attachment. Moreover, the fastener 232 may pilot to the compressor wheel 130 (and, in some embodiments, to the shaft 140) so as to position the compressor wheel 130 relative to the axis of the rotation 120 as will be discussed in greater detail below.

The rotating group 118 at the turbine section 113 of the turbomachine 101 will now be described according to example embodiments with reference to FIG. 3. This end of the rotating group 118 may have one or more features corresponding to the rotating group 118 at the compressor section 110.

The turbine wheel 131 may be a unitary, one-piece member that is generally frusto-conic. The turbine wheel 131 may include a first side 181 and a second side 182. The second side 182 may include a hub 183 that projects toward the second end 144 of the rotor shaft 140. On the first side 181, the turbine wheel 131 may include a plurality of blades 184 that oppose the shroud surface 189. The turbine wheel 131 may also include an outer radial edge 191. The turbine wheel 131 may also include a bore 193 that extends along the axis 120 through the turbine wheel 131 and that is centered thereon. The bore 193 may be defined by an inner diameter surface 195. The inner diameter surface 195 may have a substantially constant diameter as it extends through the turbine wheel 131.

The hub 183 of the turbine wheel 131 may be received and fixed inside a collar 234. The collar 234 may receive the second projecting end 174 of the rotor shaft 140. The turbine wheel 131 and collar 234 may be clamped in an axial stack-up against the shoulder 172 of the rotor shaft 140 via a fastener arrangement 230. The fastener arrangement 230 may be substantially similar to the fastener arrangement 229 of the compressor section 110.

Features of the fastener arrangement 229 of the compressor section 110 will now be discussed in detail with reference to FIG. 2. It will be appreciated that the following features can be included for the fastener arrangement 230 of the turbine section 113.

In some embodiments, the fastener arrangement 229 may include the fastener 232. The fastener 232 may extend through the compressor wheel 130 and may clamp the compressor wheel 130 to the rotor shaft 140. Also, the fastener 232 may be received in a hole 236 of the rotor shaft 140 to affix thereto.

The fastener 232 may be a unitary (one-piece) elongate member having a first end 233 and a second end 235 that are spaced apart along the axis 120. The fastener 232 may generally include a head 240 and a shank 242. The head 240 may be disposed and/or define the first end 233, and the shank 242 may extend axially from one side of the head 240. The shank 242 may be axially straight and centered on the axis. The fastener 232 may define, resemble, and/or include features similar to a bolt in some embodiments.

The fastener 232 may be made out of a single piece of metal in some embodiments. Also, the fastener 232 may be machined (e.g., turned on a lathe, threaded, and/or ground/polished/etc.) to include one or more features discussed below.

The head 240 may be cylindrical and may include a first axial surface 244 and an opposite underside axial surface 246. The head 240 may further include an outer radial surface 248. The first axial surface 244 may include a recess in some embodiments with one or more flat surfaces (e.g., surface(s) that are parallel to the axis 120 and spaced radially therefrom) for rotationally engaging the fastener 232, for example, during installation of the fastener 232 in the fastener arrangement 229. The head 240 may have a diameter that is measured between opposite areas of the radial surface 248. The diameter may be substantially constant along the axis 120 such that the head 240 substantially resembles a right circular cylinder centered on the axis 120. The diameter of the head 240 may be larger than that of the shank 242. The underside axial surface 246 may abut axially against a front axial surface 251 of the hub 205 of the compressor wheel 130.

The shank 242 may be elongate and may be integrally attached to the head 240. The shank 242 may be machined to a smaller diameter than the head 240 in some embodiments. In other embodiments, the shank 242 may be integrally attached via a welding process.

The shank 242 may include an attachment portion 250 that attaches to the first end 142 of the rotor shaft 140. In some embodiments, the attachment portion 250 may include one or more threads that helically extend from the second end 235 and along part of the axial length of the outer surface of the shank 242. The hole 236 may include an attachment segment 260 that is threaded correspondingly. Accordingly, the attachment portion 250 may threadably engage the attachment segment 260 of the hole 236. It will be appreciated that the attachment portion 250 may be attached to the rotor shaft 140 differently without departing from the scope of the present disclosure.

The shank 242 may further include at least one piloting feature 252. The piloting feature 252 may be an arcuate surface that faces radially outward (e.g., perpendicular or normal) with respect to the axis 120. For example, in some embodiments, the piloting feature 252 may be an outer diameter surface of the shank 242 that extends annularly and continuously about the axis 120. However, it will be appreciated that the piloting feature 252 may be an arcuate surface that extends partly about the axis 120 in the circumferential direction. In these embodiments, the piloting feature 252 may be formed by annular segments, for example three or more different segments, if desired. The piloting feature 252 may be centered on the axis 120. The piloting feature 252 may have a constant diameter along its axial length except that piloting feature 252 may include a taper 247 on at least one axial end. The piloting feature 252 may be ground, polished, or otherwise configured for mating, engaging, and piloting to the compressor wheel 130. The piloting feature 252 may abut and pilot to an arcuate inner radial surface of the compressor wheel 130 (e.g., to the inner diameter surface 178 of the bore 176 of the compressor wheel 130). In some embodiments, the piloting feature 252 of the fastener 232 may be disposed proximate the head 240. For example, the piloting feature 252 may be disposed directly adjacent the head 240. Accordingly, the piloting feature 252 and the attachment portion 250 may be disposed on opposite ends of the shank 242.

Furthermore, the shank 242 may include an intermediate portion 254. The intermediate portion 254 may have a diameter smaller than both the piloting feature 252 and the attachment portion 250. The intermediate portion 254 may be disposed axially between the piloting feature 252 and the attachment portion 250. The hole 236 of the rotor shaft 140 may include a first segment 259 that receives the intermediate portion 254 of the shank 242. The diameter of the first segment 259 may provide clearance for the intermediate portion 254 of the shank 242.

The fastener arrangement 230 of the turbine section 113 (FIG. 3) may be substantially similar to the fastener arrangement 229 of the compressor section 110. The fastener arrangement 230 may include a fastener 262. The fastener 262 may be a unitary part that includes a head 264 and a shank 266, similar to the fastener 232 of the compressor section 110. The head 264 may abut against an axial surface 268 of the turbine wheel 131, and the shank 266 may be received in the bore 193 as well as a hole 270 of the rotor shaft 140. The shank 266 may include an attachment section 272 and a piloting feature 274. The attachment section 272 may be threadably attached within the hole 270. The piloting feature 274 may pilot against the inner diameter surface of the bore 193 of the turbine wheel 131.

Manufacture and assembly of the turbomachine 101 has been mentioned above and will now be discussed further according to example embodiments of the present disclosure. In some embodiments, the compressor wheel 130 and collar 200 may be formed from steel and an aluminum alloy, respectively. The compressor wheel 130 may be formed and then attached to the collar 200 in an assembly process. For example, the collar 200 may be heated to enlarge the front side recess 207 so that the hub 205 of the wheel 130 may be advanced into the front side recess 207. Once the parts cool, this subassembly may be attached by an interference fit. Assembly can also include moving the thrust disc 220 onto the first projecting end 166 of the rotor shaft 140. The rotor shaft 140 and motor 134 may be provided in the motor housing 150. In some embodiments, the rotor shaft 140 may be inserted into the motor housing 150 with the thrust disc 220 on the first projecting end 166, and then a thrust cover may be attached to the motor housing 150 to cover over the thrust disc 220. Then, the wheel-and-collar subassembly may be pressed onto the first projecting end 166. Subsequently, the fastener 232 may be threadably attached to the rotor shaft 140 to clamp the wheel 130, collar 200, and thrust disc 220 against the shoulder 164. The piloting feature 252 of the fastener 232 positions or "pilots" the fastener 232 relative to the wheel 130 to position this mass relative to the axis of rotation 120. In some embodiments, the piloting feature 252 may be piloted to (i.e., may be positioned relative to) the inner diameter surface 195 of the bore 193 of the wheel 130, the wheel may be piloted to the collar 200, and the collar 200 may be piloted to the first projecting end 166 of the rotor shaft 140. It will also be appreciated that the head 240 of the fastener 232 may be unitarily attached such that the head 240 may be piloted and centered on the axis 120, thereby contributing less to unbalance of the rotating group 118 as compared to conventional fastener arrangements. Moreover, the fastener 232 may allow a less expensive compressor wheel 130 (e.g., one made from a more elastic material) to be included in the turbomachine 101.

The turbine section 113 may be assembled similar to the compressor section 110. Accordingly, the fastener 262 may clamp the turbine wheel 131 and collar 200 to the shoulder 172 of the rotor shaft 140.

It will be appreciated that this assembly includes relatively few parts and that the interfaces between the parts in the stack-up can be manufactured within tight tolerances. Accordingly, the turbomachine 101 may be manufactured to high precision and rotational balance. Also, these features allow the turbomachine 101 to be provided in a repeatable fashion for high volume manufacture. Furthermore, the head 240 of the fastener 232 remains highly accessible when installed. As such, the head 240 may conveniently provide a reference surface, for example, during testing (e.g., runout testing) of the rotating group 118. Furthermore, the head 240 may provide ample material, for example, when balancing the rotating group 118. In particular, material may be cut and removed from the head 240 (e.g., from the axial surface 244 and/or the radial surface 248) for balancing the rotating group 118. As such, unbalance is reduced up to the minimum possible level or is effectively eliminated. Moreover, the fastener 232 may be highly resistant to corrosion, making the fastener arrangement 229 highly robust.

Figure 4:
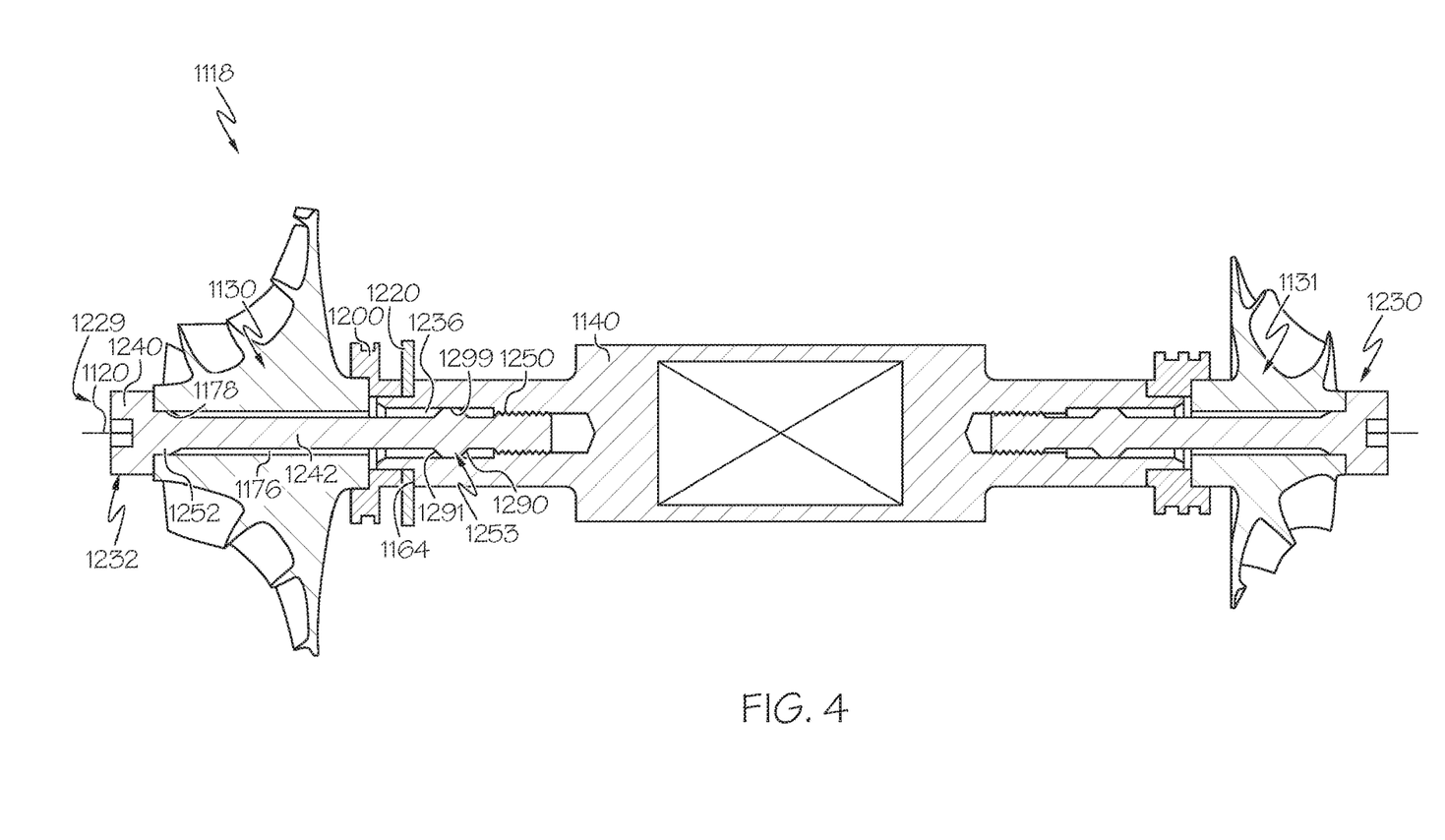
FIG. 4 is a schematic illustration of a rotating group of the motorized electric compressor device according to additional example embodiments of the present disclosure.

Referring now to FIG. 4, the rotating group 1118 is shown according to additional embodiments of the present disclosure. Although not shown in FIG. 4, the rotating group 1118 may be disposed in a housing similar to the embodiments discussed above and represented in FIG. 1. The rotating group 1118 may be substantially similar to the rotating group 1118 of FIGS. 1-3 except as noted below. Components corresponding to those of FIGS. 1-3 are indicated in FIG. 4 with reference numbers increased by 1000.

The first fastener arrangement 1229 may include the fastener 1232, which may include the head 1240 and the shank 1242. The shank 1242 may be received in the bore 1176 of the compressor wheel 1130 and the hole 1236 of the rotor shaft 1140. The shank 1242 may be threadably attached to the rotor shaft 1140 with the head 1240 clamped axially against the compressor wheel 1130. The fastener 1232 may also include the piloting feature 1252 (a first piloting feature) as well as an additional piloting feature 1253 (a second piloting feature). Like the embodiments of FIGS. 1-3, the first piloting feature 1252 may be directly adjacent the head 1240 and may abut against the opposing inner diameter surface 1178 of the bore 1176, thereby piloting the fastener 1232 to the wheel 1130.

The second piloting feature 1253 may be an arcuate surface that faces radially outward with respect to the axis 1120. For example, in some embodiments, the second piloting feature 1253 may be an outer diameter surface of the shank 1242 that extends annularly and continuously about the axis 120. However, it will be appreciated that the piloting feature 1253 may be an arcuate surface that extends partly about the axis 1120 in the circumferential direction. The piloting feature 1253 may be centered on the axis 1120. The piloting feature 1253 may have a constant diameter along its axial length except that the piloting feature 1253 may include a first taper 1290 and a second taper 1291 on the axial ends thereof. The piloting feature 1253 may be spaced apart axially from the first piloting feature 1252 and may also be spaced axially from the attachment portion 1250. Thus, the piloting feature 1253 may be axially disposed between the first piloting feature 1252 and the attachment portion 1250. The piloting feature 1253 may be ground, polished, or otherwise configured for mating against, engaging, and piloting to an inner diameter surface 1299 of the hole 1236 of the rotor shaft 1140. Accordingly, the fastener arrangement 1229 may provide the benefits discussed above with reference to FIGS. 1-3. Additionally, the piloting feature 1253 may pilot directly to the rotor shaft 1140 for further increasing manufacturing accuracy and precision. Moreover, the fastener arrangement 1230 for the turbine wheel 1131 may be configured similar to the fastener arrangement 1229 for the compressor wheel 1130.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the present disclosure in any way. Rather, the foregoing detailed description will provide those skilled in the art with a convenient road map for implementing an exemplary embodiment of the present disclosure. It is understood that various changes may be made in the function and arrangement of elements described in an exemplary embodiment without departing from the scope of the present disclosure as set forth in the appended claims.

What is claimed is:

1. A turbomachine comprising:
    a housing;
    a rotating group that is supported for rotation about an axis within the housing, the rotating group including a rotor shaft, a wheel, a fastener, and at least one intermediate member disposed between the wheel and the rotor shaft along the axis, the fastener clamping the wheel and the at least one intermediate member to the rotor shaft with the wheel spaced apart from the rotor shaft along the axis;
    the fastener being unitary and including a head and a shank, the shank including a piloting feature on an arcuate surface that faces radially outward with respect to the axis, the shank received in the wheel, extending along the axis through the at least one intermediate member, and attached to the rotor shaft with the piloting feature being piloted to an arcuate inner radial surface of the wheel, the head abutting an axial surface of the wheel for axially clamping the wheel and the at least one intermediate member to the rotor shaft.

2. The turbomachine of claim 1, wherein the shank includes an attachment portion that is threaded and threadably attached to the rotor shaft.

3. The turbomachine of claim 2, wherein the piloting feature and the attachment portion are spaced apart axially on opposite ends of the shank.

4. The turbomachine of claim 3, wherein the piloting feature is adjacent the head.

5. The turbomachine of claim 1, wherein the piloting feature is an annular surface that extends continuously about the axis.

6. The turbomachine of claim 1, wherein the piloting feature includes a taper on an end thereof.

7. The turbomachine of claim 1, wherein the piloting feature is a first piloting feature, and wherein the shank includes a second piloting feature on another arcuate surface that faces radially outward with respect to the axis, the second piloting feature being piloted to another arcuate inner radial surface of the rotor shaft.

8. The turbomachine of claim 1, wherein the arcuate surface of the shank faces substantially normal with respect to the axis, and wherein the arcuate inner radial surface faces substantially normal with respect to the axis.

9. The turbomachine of claim 1, wherein the rotor shaft includes a shoulder;
    wherein the at least one intermediate member includes a collar that is received on the rotor shaft; and
    wherein the head abuts the axial surface of the wheel to clamp both the wheel and the collar against the shoulder of the rotor shaft.

10. The turbomachine of claim 9, wherein the rotor shaft includes a projected end that projects axially from the shoulder;
    wherein the at least one intermediate member further includes a thrust disc that is received on the projected end of the rotor shaft; and
    wherein the head abuts the axial surface of the wheel to clamp the wheel, the collar, and the thrust disc against the shoulder of the rotor shaft.

11. The turbomachine of claim 1, further comprising an electric motor with a motor rotor that is fixed to the rotor shaft.

12. A method of manufacturing a turbomachine comprising:
    attaching a wheel and at least one intermediate member to a rotor shaft using a fastener to define a rotating group, the at least one intermediate member disposed between the wheel and the rotor shaft along the axis and the wheel spaced apart from the rotor shaft along the axis;
    supporting the rotating group within in a housing for rotation about an axis;
    wherein the fastener is unitary and includes a head and a shank, the shank including a piloting feature on an arcuate surface that faces radially outward with respect to the axis; and
    wherein attaching the wheel to the rotor shaft includes receiving the shank in the wheel, extending the shank through the at least one intermediate member, attaching the fastener to the rotor shaft, piloting the piloting feature to an arcuate inner radial surface of the wheel, and abutting the head against an axial surface of the wheel for axially clamping the wheel and the at least one intermediate member to the rotor shaft.

13. The method of claim 12, wherein attaching the fastener to the rotor shaft includes threadably attaching the shank to the rotor shaft.

14. The method of claim 12, wherein the piloting feature is adjacent the head.

15. The method of claim 12, wherein the piloting feature is an annular surface that extends continuously about the axis.

16. The method of claim 12, wherein the piloting feature is a first piloting feature, and wherein the shank includes a second piloting feature on another arcuate surface that faces radially outward with respect to the axis; and
   wherein attaching the wheel and the at least one intermediate member to the rotor shaft includes piloting the second piloting feature to another arcuate inner radial surface of the rotor shaft.

17. The method of claim 12, wherein the at least one intermediate member includes a collar, further comprising receiving the collar on the rotor shaft as part of the rotating group;
   and wherein attaching the wheel and the at least one intermediate member to the rotor shaft includes abutting the head against the axial surface of the wheel to clamp both the wheel and the collar against the shoulder of the rotor shaft.

18. The method of claim 17, wherein the rotor shaft includes a projected end that projects axially from the shoulder;
   further comprising receiving a thrust disc on a projecting end of the rotor shaft as part of the rotating group; and
   wherein attaching the wheel and the at least one intermediate member to the rotor shaft includes abutting the head against the axial surface of the wheel to clamp the wheel, the collar, and the thrust disc against the shoulder of the rotor shaft.

19. An electric motorized compressor device comprising:
   a housing;
   a rotating group that is supported for rotation about an axis within the housing, the rotating group including a rotor shaft, a wheel, a fastener arrangement, and at least one intermediate member disposed between the wheel and the rotor shaft along the axis, the fastener arrangement attaching the wheel and the at least one intermediate member to the rotor shaft with the wheel spaced apart from the rotor shaft along the axis;
   an electric motor that drives rotation of the rotating group about the axis within the housing;
   the fastener arrangement including a fastener that is received in a bore of the wheel and in a hole of the rotor shaft, the fastener being unitary and including a head and a shank, the shank including at least one piloting feature on an arcuate surface that faces radially outward with respect to the axis, the shank received in the bore wheel, extending along the axis through the at least one intermediate member, and threadably attached within the hole of the rotor shaft with the piloting feature being piloted to an arcuate inner radial surface of the wheel, the head abutting an axial surface of the wheel for axially clamping the wheel to the rotor shaft.

20. The electric motorized compressor device of claim 19, wherein the wheel is a compressor wheel and the fastener arrangement is a first fastener arrangement that attaches the compressor wheel to a first end of the rotor shaft; and
   further comprising a turbine wheel and a second fastener arrangement that attaches the turbine wheel to a second end of the rotor shaft;
   wherein the second fastener arrangement includes a second fastener that is received in a bore of the turbine wheel and in a second hole of the second end of the rotor shaft, the second fastener being unitary and including a head and a shank, the shank including at least one second piloting feature that faces radially outward with respect to the axis, the shank received in the bore of the turbine wheel and threadably attached within the second hole of the rotor shaft with the second piloting feature being piloted to a second arcuate inner radial surface of the wheel, the head of the second fastener abutting a second axial surface of the turbine wheel for axially clamping the turbine wheel to the rotor shaft.

\* \* \* \* \*